Dec. 29, 1970      M. HOFFMAN      3,551,048

VACUUM FILM HOLDER

Filed Oct. 1, 1968      3 Sheets-Sheet 1

MORRIS HOFFMAN,
INVENTOR.

BY *Leonard H. King*

ATTORNEY

MORRIS HOFFMAN
INVENTOR.

BY Leonard H. King
ATTORNEY

United States Patent Office 3,551,048
Patented Dec. 29, 1970

3,551,048
VACUUM FILM HOLDER
Morris Hoffman, 240 Jerusalem Ave.,
Hicksville, N.Y. 11801
Filed Oct. 1, 1968, Ser. No. 764,055
Int. Cl. G03b 27/60
U.S. Cl. 355—73                              11 Claims

ABSTRACT OF THE DISCLOSURE

Vacuum means are provided to clamp a vacuum easel or copyboard to the baseboard of an enlarger or copy camera. Material to be clamped to the easel may be removed or replaced on the easel without shifting the easel.

---

This invention relates generally to vacuum film holders and more particularly to improved means for clamping the holder to a work surface.

BACKGROUND OF THE INVENTION

Vacuum means for retaining thin, flexible photographic film on the front surface of a holder are old in the art. Generally, these holders of the prior art include a plurality of separate, nested chambers or manifolds that are sized peripherally to correspond with several standard sizes of photographic film. The front surface also includes a plurality of apertures that are arranged according to standard film sizes so that each chamber or manifold is in communication with a series of apertures of one film size. Valve means are provided to place a selected one of the chambers or manifolds and its associated apertures in communication with a source of vacuum.

My issued Pats., Nos. 3,146,690, 3,221,596, and 3,237,543 are good examples of prior art construction that is presently accepted and in wide use in the photographic industry. However, to the best of my knowledge, neither my issued patents nor any of the existing prior art utilizes the same source of vacuum to both retain the film on the front surface of the vacuum board as well as to clamp the flat rear surface of a vacuum board to a work surface; for example, the baseboard of a photographic enlarger. However, it has been recognized that it would be highly desirable and would provide an important convenience to have means for securely clamping a movable film holder once it has been properly aligned with the axis of the optical system of the photographic device.

The present invention very simply, economically and efficiently fulfills this long standing need. The same source of vacuum that retains the film on the vacuum board is used to clamp the vacuum board to the baseboard.

The device of this invention is particularly suited for use as a production tool. A feature of this dual action vacuum easel or copyboard is that the unit may be placed on a flat surface with the selector in an off position and a vacuum applied by means of a vacuum pump. Thereupon, the vacuum board locks to the table. The user selects an area that he wishes to work with such as 11″ x 14″. In that area he places photopaper, film or art work either for projection or photographing. The operator then moves the selcetor to the 11″ x 14″ position and vacuum is now actuated for clamping the material that is on the face in the area indicated. If, after an exposure has been made there is a need for making repeated exposures in the same size, the sensitive material may be placed on the easel without moving the easel position on the board. To do this the operator moves the selector back to the off position; this releases the work on the face of the vacuum board but still keeps the vacuum board locked to the table. The operator can place another piece of material such as photopaper into the same 11″ x 14″ area, without any possible movement of the vacuum board. He can repeat the operation until he has made as many exposures as desired. To move the board to size or crop for the next assignment, he shuts the vacuum pump motor off. This permits the operator to reposition the vacuum board. It is an important consideration that the aforementioned characteristics are achieved without materially adding to the cost of the basic film holder and without adding to the thickness of the film holder. It is of course understood that the holder clamping action is achieved without reducing the vacuum board holding efficiency of the apparatus.

Accordingly, it is the primary object of this invention to provide an improved vacuum board for thin, flexible sheets of photosensitive film.

It is a particular object of this invention to provide vacuum actuated means for clamping a vacuum board to a work surface.

Another object of this invention is to provide an improved vacuum board that utilizes the film holding vacuum to clamp the vacuum board to a work surface.

It is an additional object of this invention to provide the aforementioned structure in a portable vacuum board.

An advantage of this invention is that the thickness of the present vaccum board is not greater than comparable enlarging easels or copyboard that do not incorporate this invention.

A particular feature of this invention is that the apparatus is simple and economical to manufacture and is efficient in operation.

A specific object of this invention is to provide a manifold in addition to those used in a multi-sized vacuum holder, the additional manifold communicating only with apertures on the rear surface of the vacuum board and with the basic source of vacuum by means of the same valve that is used to select the manifold for a particular size sheet of thin, flexible photo-sensitive film.

These and other objects, features and advantages of the present invention will, in part, be pointed out with particularity and will, in part, be apparent from the following description taken in conjunction with the appended drawing.

In the various figures of the drawing, like reference characters designate like parts.

DESCRIPTION OF THE BEST EMBODIMENT

Figure 1:
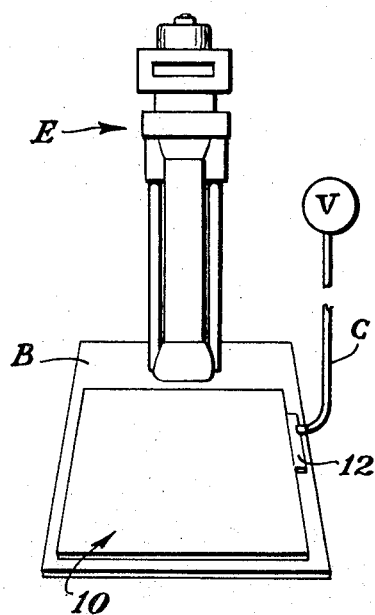
FIG. 1 is a perspective view of the improved vacuum board of the present invention which is shown in operative portion on the baseboard of a photographic enlarger.

Turning now to the drawings, FIG 1 illustrates a vacuum board 10 comprising the present invention in position on the base board B of a photographic enlarger or camera E. A remote source of vacuum V is in communication with the interior of the vacuum film holder by means of a conduit C. As will be explained more fully hereinafter a valve 12 is used to apply vacuum selectively to different size geometric areas and along the periphery thereof. For purposes of illustration four areas sized 8" x 10", 11" x 14", 14" x 17" and 16" x 20" will be described although it is to be clearly understood that the invention is not to be limited to either these particular dimensions or number of different areas. Either more or less areas may be provided with the dimensions being determined primarly by the intended application of the vacuum board.

Figure 3:
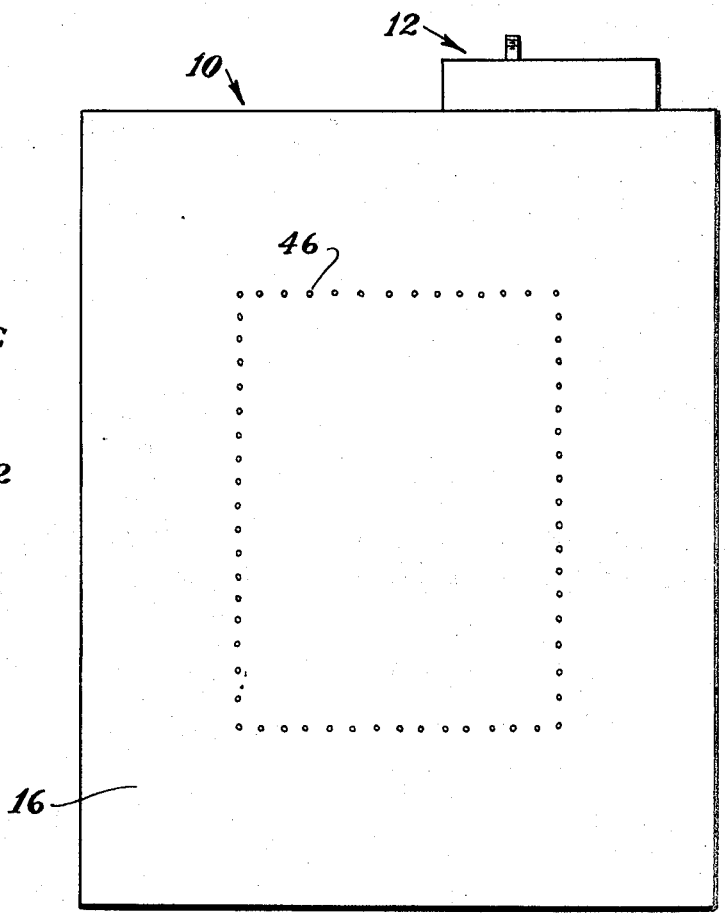
FIG. 3 is another plan view, illustrating the rear surface of the improved vacuum board shown in FIG. 1.
Figure 4:
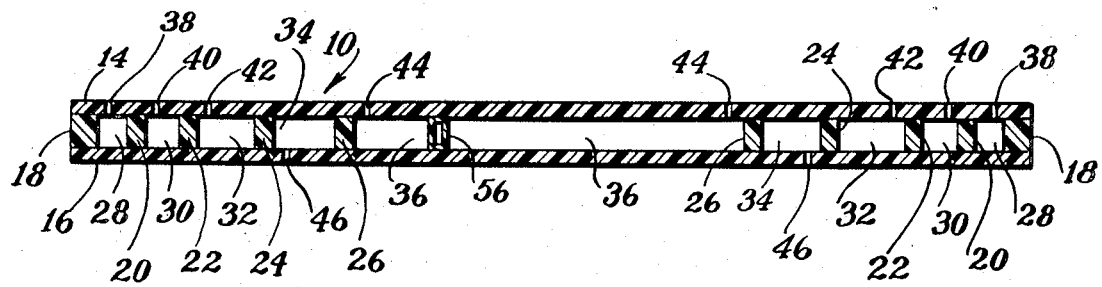
FIG. 4 is a transverse, sectional view taken along line 4—4 of FIG. 2.
Figure 2:
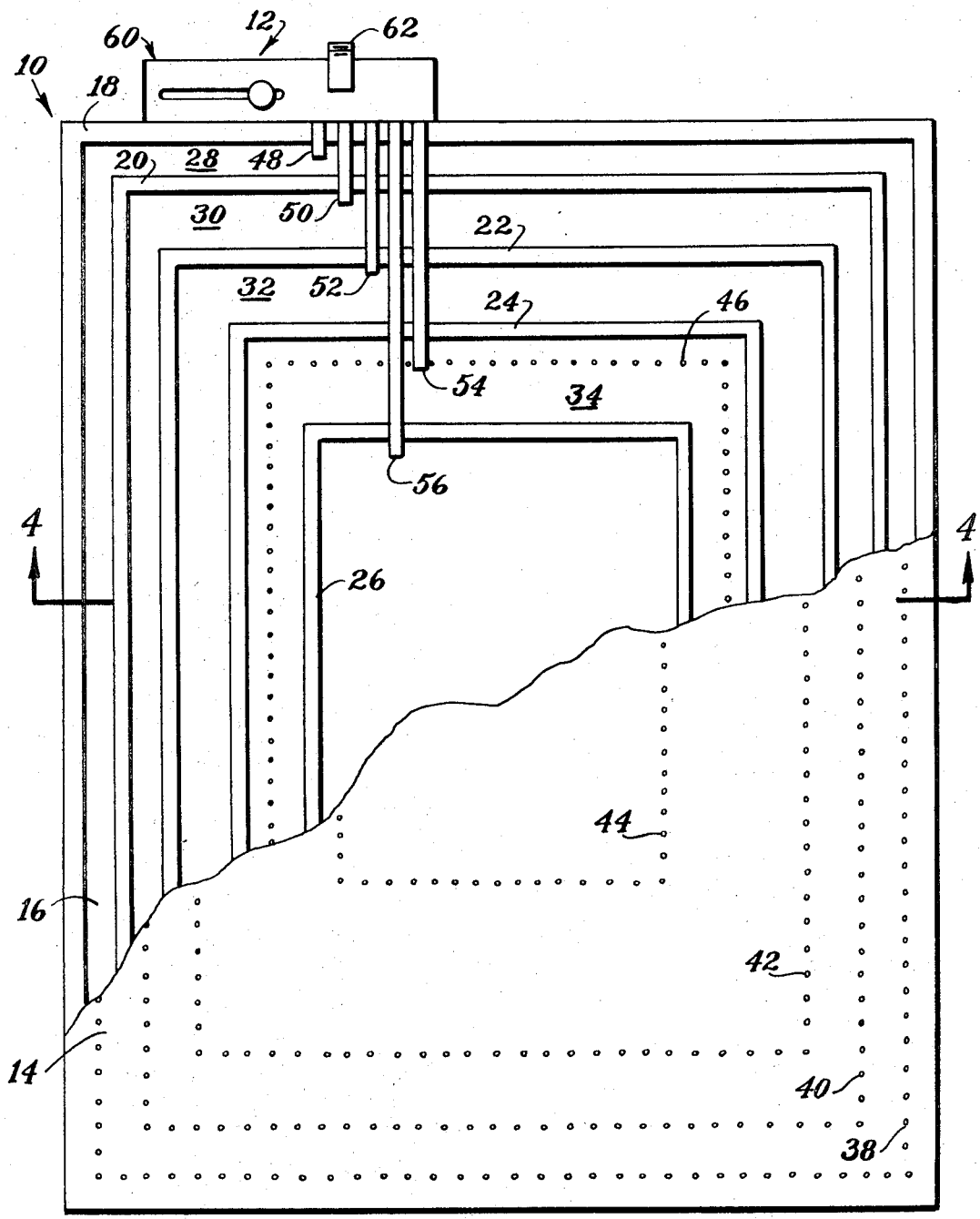
FIG. 2 is a plan view, partly broken away and partly in section, illustrating the front surface of the improved vacuum film holder shown in FIG. 1.

As shown particularly in FIG. 2, FIG. 3 and FIG. 4, the improved, portable vacuum board 10 is comprised of spaced, smooth and substantially flat front and rear sheets 14 and 16, respectively, the outwardly facing surfaces of which are in substantially parallel planes. An outer frame 18, to which sheets 14 and 16 are secured by any suitable fastening means, maintains the spacing between the sheets 14 and 16. Within the periphery of outer frame 18 there are provided four nested walls 20, 22, 24 and 26 which extend between the inwardly facing, confronting surfaces of sheets 14 and 16. Walls 20, 22, 24 and 26 are continuous and, in the embodiment illustrated, each encloses a successively smaller rectangular area, although the invention is not limited to this particular geometric pattern. Further, since the walls 20, 22, 24 and 26 are nested within frame 18 they define successively smaller chambers of manifolds 28, 30, 32, 34 and 36. Suitable means (not shown) assure that the manifolds are effectively sealed with respect to each other and from the atmosphere so that there can be no loss of vacuum. The choice of sealing means is well within the skill of a competent designer and, per se, forms no part of this invention.

Front sheet 14 is provided with a plurality of nesting rows of apertures 38, 40, 42 and 44 that extend therethrough. The rows of apertures are parallel to but spaced slightly inward of the inner facing sides of frame 18 and walls 20, 22 and 26, respectively. Apertures 38, 40, 42 and 44 thus register with chambers or manifolds 28, 30, 32 and 36, respectively. Rear sheet 16 is provided with a row of apertures 46 that extend therethrough and which are positioned intermediate the planes of the confronting surfaces of walls 24 and 26 so that they register with chamber or manifold 34. Finally, a set of hollow tubes 48, 50, 52, 54 and 56 extend through the frame 18 and walls 18, 20, 22, 24 and 26 such that their inner ends terminate in and provide communication with chambers or manifolds 28, 30, 32, 24 and 26, respectively. The hollow tubes may have the cross sectional shape shown in my issued Pat. No. 3,221,596. The outer end of each of the hollow tubes 48, 50, 52, 54 and 56 terminate within the interior of valve 12 whose structure and function will now be described.

Valve 12 is comprised of a housing 60 having an orifice 62 to which conduit C may be connected by means of a suitable coupling or fitting. Valve 12, in the embodiment illustrated, also includes a main chamber 64 that is in communication with orifice 62 as well as with channels 66, 68, 70, 72 and 74. It will be seen particularly in FIG. 5 and FIG. 6 that channels 66, 68, 70, 72 and 74 recieve the outer end of tubes 54, 56, 52, 50 and 48, respectively. A valve rod 76 is slidable, movable in a valve bore 78 to close off or open selected ones of the channels 66, 68, 70, 72 and 74, and is actuated by an external knob 80, the shank of which extends through a slot 82 in valve housing 60. The valve housing 60 also includes indicia 84 on the outside surface thereof to indicate the functional position of the knob 80.

MODE OF OPERATION

The rear surface 16 of the film holder 10 is placed on the baseboard B of the enlarger E so that the center of the film holder 10 is closely aligned with the optical axis of the photographic apparatus E. The vacuum producing source V is then placed in operation with the valve rod 76 in a completely closed position. At this point the board is locked to the table in the desired position. A sheet of photosensitive material is then placed on the front surface 14 of the vacuum board 10 with the edges of the material covering the row of apertures that correspond to the sheet. Valve knob 80 is then moved along the slot 82 until in coincides with the indicia that corresponds to the film size.

Figure 5:
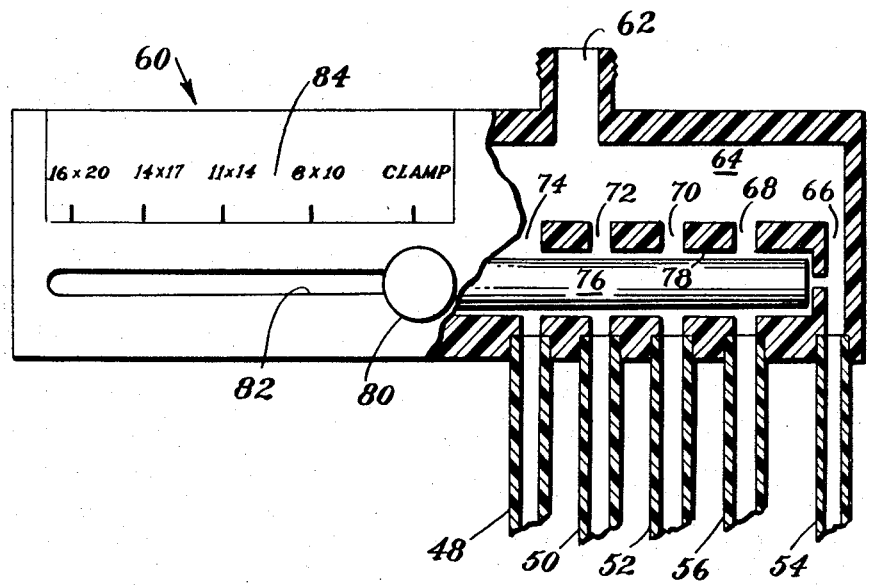
FIG. 5 is an enlarged, fragmentary plan view, partly broken away and partly in section, illustrating one form of valve that may be used in combination with the improved vacuum board shown in FIG. 1.
Figure 6:
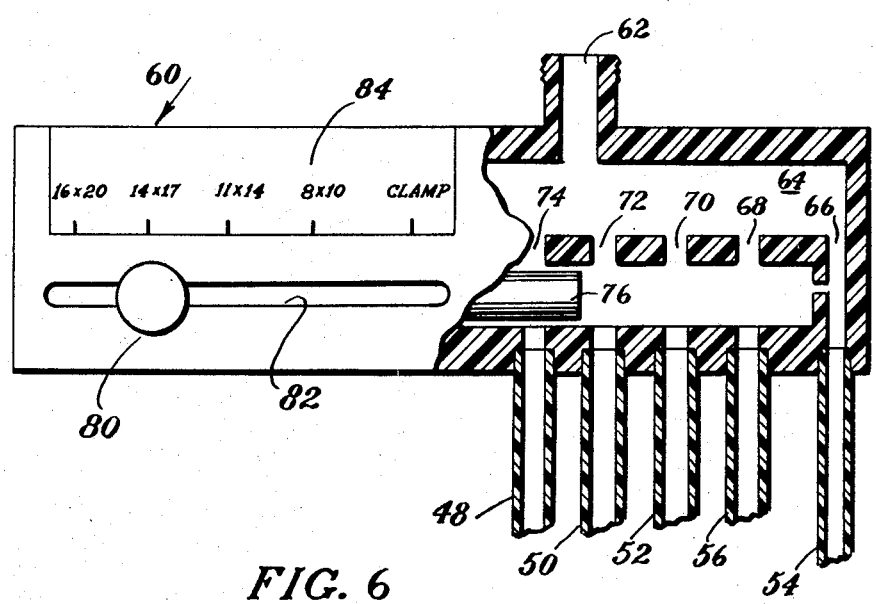
FIG. 6 is a view similar to FIG. 5 illustrating the valve in one of several possible second positions.

With the valve rod 76 in the completely closed position as shown in FIG. 5, a vacuum is produced only in chamber or manifold 34 when the vacuum producing source V is placed in operation. No other chamber or manifold is affected since only the tube 54 and channel 66 are in communication with the main chamber 64 and the source of vacuum V. The magnitude of the vacuum applied is sufficiently great to securely clamp the rear surface 16 of the vacuum board 10 to the baseboard B of the photographic apparatus E. Subsequently, after a sheet of photosensitive material is placed on the front surface 14, the valve control knob 10 is moved to the appropriate indicia (FIG. 6), for example, the one that indicates the use of a 14" x 17" size. It will be seen that tube 50 and channel 72 are now in communication with the main chamber 64 and the source of vacuum V so that the edges of the film are securely held on the front surface 14 of the vacuum holder 10. While this by itself is sufficient for many applications, it will be seen in FIG. 6 that tube 56 and channel 68 for the 8" x 10" manifold 36 as well as the tube 52 and the channel 70 for the 11" x 14" manifold 32 are also in communication with the main chamber 64 and the source of vacuum V. Thus the center of the larger sheets are securely held in place in a perfectly flat plane as is necessary for the more critical applications.

From the foregoing it will be evident that a substantial contribution has been made in the art of vacuum boards. Now, without increasing the thickness of the apparatus, a vacuum board may very easily be clamped to a work surface using the same vacuum source and same valve as is used to hold the film on the front surface of the vacuum board. The simplified construction of the instant vacuum board assures ease of operation as well as excellent efficiency and reliablity for an extended period of time.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. An improved holder for a thin sheet of flexible, photosensitive film, said holder being adapted for connection to a source of vacuum, said holder comprising, in combination:
    (a) front and rear sheets each having a plurality of apertures extending therethrough;
    (b) a frame positioned intermediate and supporting said first and second sheets in confronting relationship and in spaced apart, substantially parallel planes;
    (c) at least one wall extending between the confronting surfaces of said front and rear sheets to define a first manifold in communication with the apertures in said front sheet and a second manifold in communication with the apertures in said rear sheet; and
    (d) means communicating said first and said second manifolds with the source of vacuum.

2. A vacuum board in accordance with claim 1 including a plurality of said walls to define a plurality of said first manifolds, said first manifolds being sealed from each other and from said second manifold.

3. A vacuum board in accordance with claim 2 wherein said first manifolds are nested within each other and said second manifold is located adjacent one of said first manifolds.

4. A vacuum board in accordane with claim 3 wherein said first manifolds have the size and shape of standard sizes of photosensitive film and the apertures in said first plate are aligned in rows following the periphery of each said first manifolds.

5. A vacuum board in accordance with claim 3 wherein said means communicating said first and said second manifolds with the source of vacuum comprises a plurality of hollow tubes each of which has a first end opening into one of said manifolds and a valve interposed between the second ends of said tubes and the source of vacuum, said valve having means to couple selected ones of said manifolds to the source of vacuum.

6. A vacuum board in accordance with claim 5 wherein said valve includes means to first couple said second manifold to the source of vacuum and then selectively couple successively larger ones of said first manifolds to the source of vacuum.

7. A vacuum board in accordance with claim 5 wherein said valve includes means to first couple said second manifold to the source of vacuum, means to selectively couple successively larger ones of said first manifolds to the source of vacuum concurrently with the coupling of said second manifold to the source of vacuum and means to maintain smaller ones of said first manifolds coupled to the source of vacuum when larger ones of said first manifolds are coupled to the source of vacuum.

8. A film holder in accordance with claim 1 wherein said means communicating said first and second manifolds with the source of vacuum comprises a hollow tube coupled to each said manifold and the source of vacuum.

9. A film holder in accordance with claim 8 and further including coupling said hollow tubes to the source of vacuum.

10. A film holder in accordane with claim 9 wherein said valve includes means for coupling selected ones of said tubes to the source of vacuum.

11. A film holder in accordance with claim 2 wherein said first manifolds are nested within each other and said second manifold is located intermediate adjacent ones of said first manifolds.

References Cited

UNITED STATES PATENTS

| | | | |
|---|---|---|---|
| 3,146,490 | 9/1964 | Hoffman | 355—73 |
| 3,221,596 | 12/1965 | Hoffman | 355—73 |
| 3,237,543 | 3/1966 | Hoffman | 355—73 |

JOHN M. HORAN, Primary Examiner

D. J. CLEMENT, Assistant Examiner

U.S. Cl. X.R.

35—76